United States Patent
Levandoski et al.

[11] Patent Number: 6,140,444
[45] Date of Patent: Oct. 31, 2000

[54] CATALYST SYSTEM, PROCESS, AND SILICONE COMPOSITIONS

[75] Inventors: Michael P. Levandoski, Bristol; Hsien-Kun Chu, Wethersfield, both of Conn.

[73] Assignee: Loctite Corporation, Rocky Hill, Conn.

[21] Appl. No.: 09/232,728

[22] Filed: Jan. 19, 1999

[51] Int. Cl.⁷ .................................................. C08G 77/08
[52] U.S. Cl. ................. 528/14; 528/32; 528/33; 528/34; 528/39; 528/38; 528/21; 556/457; 522/99; 502/158; 502/167
[58] Field of Search .............................. 525/477; 528/14, 528/32, 33, 34, 39, 38; 556/459, 470; 524/492, 81; 522/172, 71; 502/158, 167

[56] References Cited

U.S. PATENT DOCUMENTS

| | | | |
|---|---|---|---|
| 4,111,890 | 9/1978 | Getson et al. | 260/37 SB |
| 4,798,889 | 1/1989 | Plueddemann et al. | 556/401 |
| 4,912,239 | 3/1990 | Bank et al. | 556/401 |
| 5,300,608 | 4/1994 | Chu et al. | 528/14 |
| 5,663,269 | 9/1997 | Chu et al. | 528/14 |

FOREIGN PATENT DOCUMENTS

| | | | |
|---|---|---|---|
| 2508467 | 12/1982 | France | C08G 77/38 |
| 1248048 | 8/1967 | Germany . | |

*Primary Examiner*—Margaret G. Moore
*Assistant Examiner*—Kuo-Liang Peng
*Attorney, Agent, or Firm*—Steven C. Bauman

[57] ABSTRACT

The invention relates to a catalyst system for reacting a silanol group with an alkoxysilane containing a polymerizable ethylenically unsaturated group. The catalyst system includes an organo-lithium reagent and a hydroxylamine. The catalyst system, permits reaction of the silanol group with alkoxysilanes containing rapidly polymerizable ethylenically unsaturated groups, such as an acryloxyalkyl group, for instance an acryloxypropyl group.

7 Claims, No Drawings

CATALYST SYSTEM, PROCESS, AND SILICONE COMPOSITIONS

BACKGROUND OF THE INVENTION

1. Field of the Invention

The present invention is directed to a catalyst system, a process and silicone compositions.

2. Brief Description of Related Technology

Organosiloxane fluids having alkoxy groups which polymerize by reaction with moisture and groups which polymerize by free-radical processes are known [see U.S. Pat. No. 5,300,608 (Chu) and U.S. Pat. No. 5,663,269 (Chu), the disclosures of each of which are hereby expressly incorporated herein by reference]. As demands for ever-faster polymerizing materials have arisen, more reactive free radical polymerizing groups have been incorporated into the alkoxy group containing organosiloxanes. However, it has been found difficult to prepare organosiloxane compositions which contain reactive free-radical polymerizing groups, such as acryloxyalkyl groups, by reaction of a silanol with a dialkoxy or trialkoxy silane containing a reactive acryloxyalkyl group.

U.S. Pat. No. 5,300,608 (Chu) and U.S. Pat. No. 5,663,269 (Chu) disclose processes for capping silanol groups with alkoxy silanes containing groups with polymerizable double bonds by reaction of the silanol with an alkoxysilane in the presence of organo-lithium reagents. These processes provide capping of a major proportion of the silanol groups. However, oftentimes the organo-lithium reagents do not produce suitable capping when the alkoxy silane contains a reactive group, such as an acryloxyalkyl or allyl group.

U.S. Pat. No. 4,798,889 (Pleuddemann) refers to a method of stabilizing unsaturated organosilicones using hydroxylamines, and U.S. Pat. No. 4,912,239 (Bank) refers to an improvement in the method of preparing an alkoxysilane in the presence of hydroxylamine as a polymerization stabilizer. However, these methods refer to stabilizing organosilicones and alkoxysilicones once formed; they do not refer to catalyzing the process of capping silanol groups with alkoxysilanes containing groups with polymerizable double bonds.

Accordingly, it would be desirable to provide a catalyst system which is capable of end capping a major portion of the silanol groups by reaction with alkoxysilanes containing a highly reactive acryloxy group or allyl group.

SUMMARY OF THE INVENTION

The present invention is directed to a catalyst system and process for capping silanol groups with alkoxysilanes containing groups with polymerizable double bonds. Particularly, the invention relates to a catalyst system and process for capping silanol groups with alkoxysilanes containing groups with highly reactive double bonds, such as acryloxyalkyl groups, allyl and vinyl groups.

According to the present invention, a catalyst system including an organo-lithium reagent and hydroxylamine is provided to react a polyalkoxy silane, such as a dialkoxy or trialkoxy silane, containing a free radically polymerizable group thereby capping the silanol group, with the alkoxy silane having at least one ethylenically unsaturated polymerizable group.

The process is ordinarily conducted by reacting a mixture of the silanol reactant with at least one polyalkoxy silane, such as a dialkoxy or trialkoxy silane containing at least one polymerizable ethylenically unsaturated group in the presence of the catalyst system at a temperature in the range of about room temperature to about 150° C., such as from about 50° C. to about 120° C., particularly from about 60° C. to about 100° C. The reaction is ordinarily conducted for a period of time of from about one hour to about ten hours, depending upon the concentration of catalyst and the reactivity of the silanol and the alkoxysilane reactants.

The catalyst system and the process are useful for end-capping silanol-terminated polysiloxanes, particularly polysiloxanes which are terminated with silanol groups at two ends. Compositions including the silanol end-capped polysilicones cure by reaction with moisture and by free radical mechanisms, such as ultraviolet light or free radical catalysis.

The invention will be further understood upon a reading of the section entitled "Detailed Description of the Invention", which follows.

DETAILED DESCRIPTION OF THE INVENTION

The silanol-terminated reactant can be virtually any useful silanol-terminated material within the general formula I as shown below:

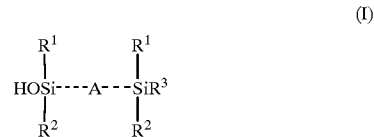

(I)

where A represents a polymer or copolymer backbone, which can be any number of combinations of polyurethane, silicone, polyamide, polyether, polyester and the like; and $R^1$ and $R^2$ may be the same or different and are monovalent hydrocarbyl groups having up to 10 carbon atoms ($C_{1-10}$), or halo- or cyano-substituted hydrocarbyl groups; and $R^3$ is a monovalent $C_{1-10}$ hydrocarbyl group or OH.

Desirable reactants within formula I include silanol-terminated organopolysiloxanes within the formula II as shown below:

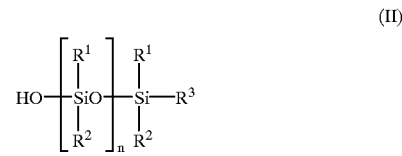

(II)

where $R^1$, $R^2$ and $R^3$ are as defined above. Within structure II, desirable groups for $R^1$ and $R_2$ include $C_{1-10}$ alkyl, such as methyl, ethyl and isopropyl, although aryl groups, such as phenyl, vinyl groups may also be used. Desirable groups for $R^3$ include OH.

The number of repeating units determines the molecular weight and hence the viscosity of the starting material. Thus, n is an integer, for example, from about 1 to about 1,200, such as about 10 to about 1,000. The viscosity may be readily chosen for a particular product application, particularly because the alkoxy terminated end product of the reaction oftentimes has substantially the same viscosity as the silanol-terminated reactant. Viscosities of these silanol-terminated organopolysiloxanes are often within the range of from about 1 cps to about 150,000 cps (measured using a Brookfield viscometer, at a temperature of about 25° C.). The viscosity range for those used in the present invention is desirably from about 100 cps to about 60,000 cps.

An example of one such silanol-terminated organopolysiloxane is a polydimethylsiloxane within the formula III as shown below:

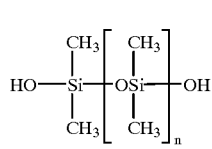

(III)

where n is from about 50 to about 160, such as from about 50 to about 70.

The alkoxysilane reactant includes a silane containing at least two alkoxy groups and at least one group containing an ethylenically unsaturated polymerizable double bond. More specifically, the alkoxysilane reactant includes at least one compound of the formula $(R^4)_a(R^5)_b Si (OR^6)_{4-(a+b)}$ (IV), where $R^4$ and $R^5$ may be the same or different monovalent groups and may contain an ethylenically unsaturated polymerizable double bond. Desirably, $R^4$, $R^5$ and $R^6$ each contain from 1–10 carbon atoms and may contain heteroatoms, such as O, N, or S, and may be substituted with halo atoms, such as fluorine or chlorine. Desirably, at least one of $R^4$ and $R^5$ is chosen from methyl, ethyl, isopropyl and phenyl, $R^6$ is chosen from methyl, ethyl, isopropyl and —$CH_2CH_2OCH_3$, and a is 0, 1 or 2; b is 0, 1 or 2; and a+b is 1 or 2.

It is particularly desirable for at least one of $R^4$ and $R^5$ to be acryloxy propyl or allyl.

Representative polyalkoxysilanes useful in the present invention include: $(CH_3O)_3SiCH=CH_2$, $(C_2H_5O)_3SiCH=CH_2$, $(CH_3O)_3SiCH_2CH=CH_2$, $(CH_3O)_3SiCH_2(CH_3)C=CH_2$, $CH_2=CHSi(OCH_2CH_2OCH_3)3$, $(CH_3O)_3Si (CH_2)_3OOC(CH_3)C=CH_2$, $(CH_3O)_2Si ((CH_2)_3OOC-(CH_3)C=CH_2)_2$, $(CH_3O)_3Si (C_6H_4)-CH=CH_2$, $(CH_2H_5O)_3SiCH_2-(C_6H_4)-CH=CH_2$, $(C_2H_5O)_3SiCH_2CH=CH_2$, $(CH_3O)_3Si(CH_2)_2-(C_6H_4)-CH_2OC(O)C(CH_3)=CH_2$, $(C_2H_5O)_3Si(CH_2)_3OOC(CH_3)C=CH_2$, $(CH_3O)_2Si(CH=CH_2)_2$, $(CH_3)(CH_2=CH)Si(OCH_3)_2$, and $(CH_3O)_3Si(CH_2)_3OOCCH=CH_2$.

The catalyst system and process of the present invention are particularly effective in reacting silanols with alkoxysilanes having polymerizable ethylenic bonds which are sufficiently rapid reacting that the capped composition is not formed in a commercially efficient manner by use of organo-lithium reagent catalysts alone. The catalyst system and process of the invention are particularly useful in reacting silanol terminated (co)polymers with compounds such as trimethoxyacryloxypropylsilane, triethoxyacryloxypropylsilane, triemethoxyacryloxyethylsilane, dimethoxydimethacryloxypropylsilane, triethoxyallylsilane and the like.

The catalyst system includes at least one organo-lithium reagent of the formula $LiR^7$ (V) where the organo group $R^7$ is chosen from $C_{1-18}$ alkyl, $C_{1-18}$ aryl, $C_{1-18}$ alkylaryl, $C_{1-18}$ arylalkyl, $C_{2-18}$ alkenyl, and $C_{2-18}$ alkynyl groups; amine-containing groups; and organosilicone-containing groups. Desirably, $R^7$ is $C_{1-18}$ alkyl, such as n-butyl.

The catalyst system is present in catalytically effective amounts and enhances the process and the quality of the product made therefrom.

The organo-lithium reagent is desirably an alkyl lithium, such as methyl, n-butyl, sec-butyl, t-butyl, n-hexyl, 2-ethylhexyl and n-octyl lithium. Other useful catalysts include phenyl lithium, vinyl lithium, lithium phenylacetylide, lithium (trimethylsilyl) acetylide, lithium silanolates and lithium siloxanolates. The organo group can also be an amine-containing group, such as dimethylamine, diethylamine, diisopropylamine or dicyclohexylamine, or a silicone-containing group.

Useful lithium silanolates may be within the formula $LiOSiR^8R^9R^{10}$ (VI), where $R^8$ and $R^9$ are monovalent hydrocarbon groups, such as $C_{1-10}$ alkyl, for instance methyl, ethyl and butyl, as well as aryl, for instance phenyl, and $R^{10}$ is $C_{1-18}$ alkyl or $C_{1-18}$ aryl.

Useful lithium siloxanolates may be within the formula $LiO(SiR^8R^9O)_tSiR^8R^9R^{10}$ (VII), where $R^8$ and $R^9$ are as described above, $R^{10}$ is as described above and t is an integer, such as from 1 to 10.

The organo-lithium reagents are used in catalytically effective amounts. Generally, the amount varies with the chosen catalyst and reactant materials, but about 1 to about 1000 ppm of lithium (calculated as lithium metal based on the weigh of the reactants) is ordinarily within the useful range. A particularly range is from about 5 to about 500 ppm, such as from about 8 ppm to about 200 ppm of lithium based on the weight of the reactants.

The hydroxylamine compounds useful in the catalyst system of the invention are compounds within the formula $Q_2NOH$ (VIII), in which Q independently is an alkyl group having $C_{1-12}$, a cycloalkyl group having $C_{5-12}$ or an aryl group having $C_{6-9}$. Examples of specific alkyl groups which are suitable include methyl, ethyl, propyl, isopropyl, butyl, ethylhexyl, nonyl, decyl and dodecyl groups. Specific cycloalkyl groups include cyclopentyl, cyclohexyl and cyclooctyl groups. Illustrative of the aryl groups are phenyl, benzyl, styryl, tolyl and xenyl groups. The Q groups may be mixed so that hydroxylamine compounds, such as ethylbenzylhydroxylamine, ethylcyclopentylhydroxylamine, ethylmethylhydroxylamine, and the like, are contemplated herein.

The hydroxylamine compound may also be selected from compounds within the formula IX

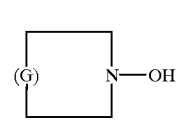

(IX)

where G is an alkyl or alkenyl group of $C_{5-11}$—$(CH_2)_j$—, where j is 5 to 8, particularly 5.

Certain of the hydroxylamine compounds useful in the present invention are well known in the art [see e.g., U.S. Pat. No. 4,912,239 (Bank), the disclosure of which is hereby expressly incorporated herein by reference] and may generally be prepared by reacting hydroxylamine or a substituted hydroxylamine with an activated halogen compound in the presence of an acid acceptor or by oxidizing an amine with a peroxy compound such as hydrogen peroxide followed by reduction of the intermediate formed. Alternatively, the oxime of a cyclic ketone may be reduced to the corresponding hydroxylamine.

It is desirable that the hydroxylamine compound be selected from diethylhydroxylamine or dibenzylhydroxylamine, with diethylhydroxylamine being more desirable.

The process of the invention provides a process of capping silanol groups with alkoxysilanes which is not believed possible using organo-lithium or hydroxylamine catalysts alone under reasonable conditions. The process is useful particularly with alkoxysilane containing acryloxyalkyl group and particularly acryloxypropyl groups.

More specifically, the process of the invention includes the steps of forming a mixture of the silanol-terminated reactant, alkoxysilane, and catalyst system of organolithium reagent and hydroxylamine, and reacting the mixture with agitation in the absence of moisture until the desired amount of silanol capping has occurred. Where substantially complete capping is desired, the equivalent ratio of silanol groups to alkoxysilane is desirably from about 1:.95 to about 1:1.5, and more desirably from about 1:1 to about 1:1.2. Any volatile materials remaining in the reaction mixture after the capping has reached the required level can be removed by a mild heating under reduced pressure. An inert gas can be passed through the reaction mixture during the removal of the volatile materials.

The process can be carried out at temperatures of from about room temperature to about 150° C. The temperature at which the process is conducted depends on the particular reactants chosen, the identity and amount of the constituents of the catalyst system and the length of time the reaction can proceed.

The catalyst system comprises a ratio by weight of lithium (based on the weight of lithium metal in the organo-lithium reagent) to hydroxylamine of from about 1:1000 to about 1:1, desirably from about 1:2 to about 1:200, such as from about 1:3 to about 1:50. The ratio of lithium to hydroxylamine depends on the composition of the hydroxylamine; higher molecular weight hydroxylamines use a higher ratio of hydroxylamine to lithium in the catalyst system.

The organo-lithium reagent and the hydroxylamine are nonetheless present in catalytic amounts.

Generally, the amount of lithium in the reaction mixture is from 1 ppm to about 1000 ppm, desirably from about 5 ppm to about 500 ppm, such as from about 8 ppm to about 200 ppm, based on the weight of the reactants.

The amount of hydroxylamine in the reaction mixture ranges from about 10 ppm to about 1000 ppm, desirable from about 30 to about 350 ppm, such as from about 50 ppm to 250 ppm, based on the weight of the reactants.

The amount of the organo-lithium reagent and the hydroxylamine used in the catalyst system depends on the reactivity of the silanol group-containing reactant and the reactivity of the alkoxysilane containing the polymerizable ethylenically unsaturated group. The amount chosen may be readily determined by those persons skilled in the art.

After the reaction, the lithium catalyst can be reacted with carbon dioxide, precipitated as lithium carbonate and removed from the reaction mixture by liquid-solid separation means such as centrifuging, filtration and the like. Low molecular weight hydroxylamine and other low boiling point materials can be separated by heating the reaction mixture under reduced pressure.

The reaction product comprises a capped silanol within the formula X as shown below:

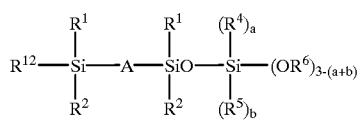

(X)

where $R^1$, $R^2$, $R^4$, $R^5$, $R^6$, A, a and b are as defined above, and $R^{12}$ is a monovalent hydrocarbyl group or

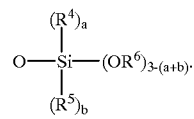

Due to the presence of at least one O—$R^6$ group and at least one polymerizable ethylenically unsaturated group, the "capped silanol" can react with moisture and react by a free radical mechanism. The free radicals can be generated by exposure to UV light in the presence of a free radical initiator.

The present invention further relates to compositions capable of curing by both photo- and moisture-curing mechanisms and having a substantially shelf stable viscosity. These compositions include:

(a) a reactive organopolysiloxane prepared using the catalyst system as described herein, which reactive organopolysiloxane has at least two alkoxy groups on both terminal ends and at least one photocurable group on at least one terminal end;

(b) an effective amount of a photoinitiator; and (c) an effective amount of a moisture curing catalyst.

The reactive organopolysiloxane of (a) is the reaction product of an organopolysiloxane having at least both ends terminating with a silanol group with a silane containing at least three alkoxy groups and at least one photo-curable group.

A particularly desirable organopolysiloxane prepared by the reaction described above is within the formula XI where $R^3$ is an acryloxy propyl group, $CH_2CH—COOC_3H_6$, $R^4$ is methyl or ethyl, and $R^1$ and $R^2$ are as described above, such as methyl. Accordingly, such particularly desirable organopolysiloxanes within formula:

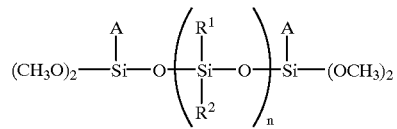

(XI)

are where A is the acryloxypropyl group, and n is from 1 to 1,200.

Due to the presence of both alkoxy and acrylate groups, this organopolysiloxane is capable of curing by both moisture and photo curing mechanisms. Thus, for example, this polymer fluid material or a composition comprising the material can be subjected to UV light in the presence of a photoinitiator to partially cure or gel the material, which can then be allowed to cure further by moisture under ambient conditions.

The resultant alkoxy end-capped organosiloxane fluids can then be mixed with other conventional additives such as curing agents, inorganic fillers, adhesion promoters, pigments, moisture scavengers and the like to form a one-part curable composition. Inorganic fillers, such as hydrophobic fumed silica or quartz, serve to impart desirable physical properties to the cured material. Moisture scavengers, such as methyltrimethoxysilane and vinyltrimethyloxysilane, are useful as well.

These curable compositions are obtained by adding to 100 parts (by weight) of the functionalized polymer prepared according to the process of the present invention:

(a) 0 to 250 parts of inorganic fillers;

(b) 0 to 20 parts, such as 0 to 10 parts, of adhesion promoters, for instance silanes or polysiloxanes, such as glycidoxypropyltrimethoxysilane, aminopropyltrimethoxysilane, methacryloxypropyltrimethoxysilane, and aminoethylaminopropyltrimethoxysilane simultaneously bearing per molecule:

(i) at least one $C_3$–$C_{15}$ organic group bonded by a SiC bond to the silicon atom and substituted by amino, glycidoxy or mercapto radicals and the like; and (ii) at least one $C_1$–$C_3$ alkoxy radical or a $C_3$–$C_6$ alkoxyalkyleneoxy radical bonded by a SiO bond to the silicon atom; and (c) an effective amount of a condensation catalyst.

By "effective amount" of condensation catalyst is intended, for example, from about 0.1 to about 5% by weight and preferably about 0.25 to about 2.5% by weight of at least one compound of a metal which is typically selected from among titanium, tin, zirconium and mixtures thereof. Tetraisopropoxytitanate and tetrabutoxytitanate are desirable, but others that are useful may be found in U.S. Pat. 4,111, 890, the disclosure of which is hereby expressly incorporated herein by reference.

It should be appreciated that the reactive organopolysiloxane materials prepared in accordance with the present invention may be curable by moisture alone. In such cases no photoinitiator need be present.

In formulating useful dual curing compositions of the invention it is necessary to include in the formulation a moisture curing catalyst, such as a titanium catalyst, in the formulation.

The dual curing compositions formulated in accordance with the invention also include a photoinitiator. Any known radical photoinitiator can be used as well as mixtures thereof without departing from the invention hereof. Sample photoinitiators include benzoin and substituted benzoin compounds, benzophenone, Michler's ketone dialkoxybenzophenones, dialkoxyacetophenones, and the like. Photoinitiators made compatible with silicones by binding photoinitiating groups to organosiloxane polymer backbones may also be used.

The amount of photoinitiator used in the composition will typically be in the range of between about 0.1% and 5% of the composition. Depending on the characteristics of the particular photoinitiator, however, amounts outside of this range may be employed without departing from the invention so long as they perform the function of rapidly and efficiently initiating polymerization of the acrylic groups. In particular, higher percentages may be required if silicone bound photoinitiators are used with high equivalent weight per photoinitiating group.

It should also be understood that while the photoinitiator is used as a separate ingredient, the formulations used in the inventive method are intended to include formulations in which photoinitiating groups are included on the backbone of the same organopolysiloxane polymer which includes the photo curing and alkoxy groups discussed above. Preferred photo curing groups which may be attached to the organopolysiloxane include acrylate, methacrylate and glycidoxy groups.

The inventive compositions may also contain other additives, provided they do not interfere with UV and moisture curing mechanisms, such as expandable spheres useful to prepare foamed end products.

The invention will be further illustrated by way of the following examples.

EXAMPLES

Example 1

In a 5 liter, 4-neck round bottom flask equipped with mechanical stirrer, heating mantle, sparge tube and thermometer was charged 2008 g of an α,ω-hydroxyl terminated polydimethylsiloxane (having a viscosity of 100 cps). The fluid was heated to a temperature of 85° C. and sparged with nitrogen for a period of time of 45 minutes to remove any volatile components such as water and carbon dioxide. Acryloxypropyltrimethoxysilane ("APTMS", 248.3 g) was then slowly added to the reactor over a period of time of 10 minutes. Diethylhydroxylamine ("DEHA", 0.113 g) and n-butyllithium in hexane solution (1.6M; 1.5 mL) were sequentially added to the reactor. The mixture was maintained at a temperature of 85° C. under nitrogen sparge for a period of time of 4 hours.

A small quantity of the mixture was then withdrawn, and was mixed with 1.5% by weight of the photoinitiator, diethylacetophenone ("DEAP"). The material was placed in between 2 layers of polyethylene films with 1 mm thickness which are 0.075" apart. The films were held in a glass plate fixture. The material was cured by UV with an intensity of 75 mw/cm$^2$ for one minute on each side. The mixture UV cured to an elastomer with a Shore 00 Durometer of 30. The reaction mixture was further heated for an additional period of time of 2 hours at a temperature of 85° C. with nitrogen sparge.

A small quantity of the mixture was again tested for UV cure as described above, and was found to UV cure to an elastomer with a Shore 00 Durometer of 62. Dry ice (0.34 g) was then added to the reaction mixture to quench the catalyst. The mixture was vacuum stripped to remove volatile components. To the final reaction mixture was added 1.5% by weight of DEAP, and UV cured as described before to an elastomer with a Shore 00 Durometer of 70.

Example 2

In a 30 gallon reactor equipped with mechanical stirrer, heating/cooling capability, bottom sparge tube and thermometer was charged 54.3 kilograms (89.2%) of an α,ω-hydroxyl-terminated polydimethylsiloxane (having a viscosity of 100 cps). The fluid was heated to a temperature of 85° C. and sparged with nitrogen for a period of time of 45 minutes to remove any volatile compounds such as water and carbon dioxide gas. A first addition of APTMS (6.09 kg/10.5%) was then added to the reactor and sparged with nitrogen for a period of time of 10 minutes. DEHA (3.0 g/0.005%) and n-butyllithium in hexane solution (1.6M; 40.5 mL/0.045%) were sequentially added to the reactor. The mixture was maintained at a temperature of 85° C. while reacting under a nitrogen sparge for a period of time of 3 hours.

The second addition of APTMS (0.152 kg/0.25%) was then made to the reactor and the reaction was allowed to continue for a period of time of 1 hour. A small quantity of the mixture was then withdrawn and mixed with 1.5% by weight of DEAP. The material was placed in between 2 layers of polyethylene films with 1 mm thickness which are 0.075" apart. The films were held in a glass plate fixture. The material was cured by UV with an intensity of 75 mw/cm$^2$ for one minute on each side. The mixture UV cured to an elastomer with a Shore 00 Durometer of 67. The reaction catalyst was then quenched with dry ice. The mixture was vacuum stripped for a period of time of 1 hour at a temperature of 85° C. to remove all volatile components. To the final reaction mixture was added 1.5% by weight of DEAP and UV cured as described before to an elastomer with a Shore 00 Durometer of 73.

Comparative Example 1

In a 5 liter, 4-neck round bottom flask equipped with mechanical stirrer, heating mantle, sparge tube and thermometer was charged 2530 g of an α,ω-hydroxyl terminated polydimethylsiloxane (having a viscosity of 100 cps). The fluid was heated to a temperature of 50° C. while sparging with nitrogen for a period of time of 45 minutes to remove any volatile compounds such as water and carbon dioxide gas. APTMS (321 g) was then added to the reactor while nitrogen sparging. After 10 minutes, 1.28 g (1.6M; 1.9 mL) of n-butyllithium in hexane solution was added. The temperature was held at a temperature of 50C while reacting under a nitrogen sparge for a period of time of 4 hours. A small quantity of the mixture was then withdrawn and was mixed with 1.5% by weight of DEAP. The material was placed in between 2 layers of polyethylene films with 1 mm thickness which are 0.075" apart. The films were held in a glass plate fixture. The material was cured by UV with an intensity of 75 mw/cm$^2$ for one minute on each side. The mixture did not UV cure.

A further 2.0 mL of n-butyl lithium in hexane solution (1.6M) was added to the mixture and allowed to react for an additional hour. A small quantity of the mixture was again tested for UV cure as described above and also did not cure. The nitrogen sparge was then terminated, the mixture was sealed close and left to react at room temperature over night. The mixture was again tested for UV cure as described above but still failed to cure.

Comparative Example 2

In a 5 liter, 4-neck round bottom flask equipped with mechanical stirrer, heating mantle, sparge tube and thermometer was charged 2406 g of an α,ω-hydroxyl terminated polydimethylsiloxane (having a viscosity of 100 cps). The fluid was heated to a temperature of 80° C. and sparged with nitrogen for a period of time of 45 minutes to remove any volatile components such as water and carbon dioxide gas. APTMS (324 g) was then added drop wise to the silanol fluid while also charging 3.7 g (5.4 mL) n-butyllithium in hexane solution (1.6M) into the mixture by a syringe. The mixture was heated for a period of time of 3 hours at a temperature of 80° C. under nitrogen sparge. A small quantity of the mixture was then withdrawn, and mixed with 1.5% by weight of DEAP. The material was placed in between 2 layers of polyethylene films with 1 mm thickness which are 0.075" apart. The films were held in a glass plate fixture. The material was cured by UV with an intensity of 75 mw/cm$^2$ for one minute on each side. The mixture failed to UV cure.

Comparative Example 3

In a 5 liter, 4-neck round bottom flask equipped with mechanical stirrer, heating mantle, sparge tube and thermometer was charged 1821.4 g of an α,ω-hydroxyl terminated polydimethylsiloxane (having a viscosity of 100 cps). The fluid was heated to a temperature of 85° C. with a nitrogen sparge for a period of time of 45 minutes to remove any volatile components such as water and carbon dioxide gas. APTMS (225.2 g) was then added to the silanol fluid and mixed for a period of time of 5 minutes. DEHA (0.1 g) was then added to the mixture. The mixture was maintained at a temperature of 85° C. with a nitrogen sparge and allowed to react for a period of time of 3 hours. A small quantity of the mixture was withdrawn and tested for UV cure by adding 1.5% by weight of DEAP. The material was placed in between 2 layers of polyethylene films with 1 mm thickness which are 0.075" apart. The films were held in a glass plate fixture. The material was cured by UV with an intensity of 75 mw/cm$^2$ for one minute on each side. This mixture failed to UV cure.

The reaction mixture flask was further heated at a temperature of 85° C. for an additional period of time of 8 hours. A small quantity of the mixture was again tested for UV cure by the procedure describe above and was shown to cure to a soft elastomer with a Shore 00 Durometer of about 35–40. As noted above, to be suitable for use, a Shore 00 Durometer value of at least 50 is typical, though 70–80 is particularly desirable. Further heating of the reaction mixture at a temperature of 85° C. for an additional period of time of 24 hours with nitrogen sparge did not improve the UV cure of the mixture.

Example 3

In a 5 liter 4-neck round bottom flask equipped with mechanical stirrer, heating mantle, sparge tube and thermometer is charged 2272.1 g of an α,ω-hydroxyl terminated polydimethylsiloxane (having a viscosity of 750 cps). The fluid is heated to a temperature of 80° C. with nitrogen sparge for a period of time of 1 hour to remove any volatile components such as water and carbon dioxide gas. APTMS (176.51 g) is then added to the fluid and the mixture is mixed for 5 minutes. DEHA (0.118 g) and n-butyllithium in hexane solution (1.6M; 1.06 mL) are then added to the mixture sequentially. The mixture is heated at a temperature of 80° C. with nitrogen sparge for a period of time of 16 hours. Nitrogen sparge is then terminated A small amount of dry ice (about 0.35 g) is added to the mixture and the mixture is further mixed for an additional period of time of 3 hours. The mixture is vacuum stripped for a period of time of 1 hour, and filtered to give α,ω-acryloxydimethoxysilyl terminated polydimethylsiloxane.

As can be seen from the examples above, the catalyst system of the present invention and the process which utilizes the catalyst system can provide dual curing products containing rapidly polymerizing ethylenically unsaturated groups which could not be prepared in a reasonable time using otherwise known materials. This invention also allows using a minimum amount of excess silane as a capping agent, thereby improving the "tack" of the finished product.

The true scope of the invention is measured by the claims.
What is claimed is:
1. A catalyst system comprising an organo-lithium reagent and a hydroxylamine.
2. The catalyst system of claim 1, wherein the organo-lithium reagent comprises a compound of the formula LiR$^7$, wherein R$^7$ is selected from the group consisting of allyl, aryl, alkylaryl, arylalkyl, alkenyl and alkynyl, each containing from 1–18 carbon atoms.
3. The catalyst system of claim 1, wherein the organo-lithium reagent comprises at least one member selected from the group consisting of lithium silanolates of the formula LiOSiR$^8$R$^9$R$^{10}$ wherein R$^8$ and R$^9$ are monovalent hydrocarbon groups containing from 1 to 10 carbon atoms and R$^{10}$ is an alkyl or aryl group containing 1–18 carbon atoms and lithium siloxanolates of the formula LiO(SiR$^8$R$^9$O)$_t$SiR$^8$R$^9$R$^{10}$ wherein t is an integer of from 1 to 10.
4. The catalyst system of claim 1, wherein the hydroxylamine comprises at least one compound selected from the group consisting of compounds of the formula $Q_2NOH$, wherein Q is an alkyl group having $C_{1-12}$, a cycloalkyl group having $C_{5-12}$ or an aryl group having $C_{6-9}$; and

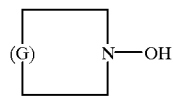

wherein G is an alkyl or alkenyl group of $C_{5-11}$—$(CH_2)_j$—, wherein j is 5 to 8.

5. The catalyst system of claim 1, wherein the ratio by weight of lithium in the organo-lithium reagent to hydroxylamine is from about 1:1000 to about 1:1.

6. A process for preparing an end-capped polysiloxane, the steps of which comprise:

forming a mixture comprising:

a silanol within the formula:

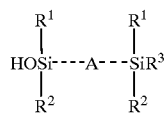

wherein A represents a polymer or copolymer backbone selected from the group consisting of polyurethane, silicone, polyamide, polyether, polyester and combinations thereof; and $R^1$ and $R^2$ may be the same or different and are monovalent hydrocarbyl groups having up to 10 carbon atoms ($C_{1-10}$), or halo- or cyano-substituted hydrocarbyl groups, and $R^3$ is a monovalent $C_{1-10}$ hydrocarbyl group or OH;

at least one alkoxysilane having a silane containing at least two alkoxy groups and at least one group containing an ethylenically unsaturated polymerizable double bond, and a catalyst system according to claim 1; and reacting the mixture in the absence of moisture at a temperature of from about room temperature to about 150° C. to form a composition within the formula

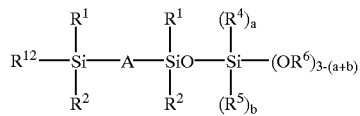

wherein A represents a polymer or copolymer backbone selected from the group consisting of polyurethane, silicone, polyamide, polyether, polyester and combinations thereof; $R^1$ and $R^2$ may be the same or different and are monovalent hydrocarbyl groups having up to 10 carbon atoms ($C_{1-10}$), or halo- or cyano-substituted hydrocarbyl groups; $R^4$, $R^5$ and $R^6$ may be the same or different and are groups comprising from 1 to 10 carbon atoms which may contain heteroatoms and halogen atoms, having an ethylenically unsaturated polymerizable double bond; $R^{12}$ is a monovalent hydrocarbyl group or

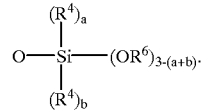

and a is 0, 1 or 2; b is 0, 1 or 2; and a+b is 1 or 2.

7. The process according to claim 6, wherein the organo lithium reagent is selected from the group of lithium reagents consisting of $LiR^7$ according to claim 1, lithium silanolates and lithium siloxanolates according to claim 1.

* * * * *

UNITED STATES PATENT AND TRADEMARK OFFICE
CERTIFICATE OF CORRECTION

PATENT NO.     : 6,140,444
DATED          : October 31, 2000
INVENTOR(S)    : Levandoski et al.

It is certified that error appears in the above-identified patent and that said Letters Patent is hereby corrected as shown below:

<u>Column 2,</u>
Line 51, delete "desirable groups for $R^1$ and $R_2$" and replace with -- desirable groups for $R^1$ and $R^2$ --.

<u>Column 3,</u>
Lines 33-34, delete "$(OCH_2CH_2OCH_3)3$," and replace with -- $(OCH_2CH_2OCH_3)_3$, --.

Signed and Sealed this

Twenty-eighth Day of May, 2002

Attest:

Attesting Officer

JAMES E. ROGAN
*Director of the United States Patent and Trademark Office*